(12) United States Patent
Sprogis

(10) Patent No.: US 6,932,698 B2
(45) Date of Patent: *Aug. 23, 2005

(54) TREASURE HUNT GAME UTILIZING WIRELESS COMMUNICATIONS DEVICES AND LOCATION POSITIONING TECHNOLOGY

(76) Inventor: Peter Sprogis, 25 Saltsmakers court, William Morris way, London (GB), sw6 2ux ( * ) Notice: Subject to any disclaimer, the term of this patent is extended or adjusted under 35 U.S.C. 154(b) by 250 days.

This patent is subject to a terminal disclaimer.

(21) Appl. No.: 10/059,687

(22) Filed: Jan. 31, 2002

(65) Prior Publication Data

US 2003/0144047 A1 Jul. 31, 2003

(51) Int. Cl.[7] .......................... A63F 9/18; A63F 13/12; G08B 9/00
(52) U.S. Cl. .............................. 463/9; 463/40; 273/254; 273/429; 340/323 R
(58) Field of Search ................................ 463/1, 9, 40–42, 463/47; 273/254, 148 B, 429–432, 445, 459, 460; 434/128, 130, 139, 141, 147, 150, 322, 433; 340/323 R, 286.02, 995.1–995.28; 342/357.1, 357.12, 357.13, 357.06–357.09

(56) References Cited

U.S. PATENT DOCUMENTS

| | | | |
|---|---|---|---|
| 5,236,200 A | 8/1993 | McGregor | |
| 5,511,792 A | 4/1996 | Simmons | |
| 5,646,629 A | 7/1997 | Loomis | |
| 5,679,075 A | 10/1997 | Forrest | |
| 5,924,695 A | 7/1999 | Keykoop | |
| 5,933,100 A | 8/1999 | Golding | |
| 5,942,969 A * | 8/1999 | Wicks | 340/286.02 |
| 6,023,241 A | 2/2000 | Clapper | |
| 6,102,406 A * | 8/2000 | Miles et al. | 273/430 |
| 6,320,495 B1 * | 11/2001 | Sporgis | 340/323 R |
| 6,401,033 B1 * | 6/2002 | Paulauskas et al. | 701/207 |
| 6,452,930 B1 * | 9/2002 | Seidman | 370/400 |
| 6,659,861 B1 * | 12/2003 | Faris et al. | 463/1 |
| 2001/0018365 A1 * | 8/2001 | Orui et al. | 463/40 |
| 2002/0090985 A1 * | 7/2002 | Tochner et al. | 463/1 |
| 2002/0142759 A1 * | 10/2002 | Newell et al. | 455/414 |
| 2003/0155413 A1 * | 8/2003 | Kovesdi et al. | 235/375 |

* cited by examiner

Primary Examiner—Scott Jones
(74) Attorney, Agent, or Firm—Gibson, Dunn & Crutcher LLP

(57) ABSTRACT

A treasure hunt type game that utilizes location positioning technology equipped wireless communications devices. Players are given clues or directions to proceed along one of many predetermined treasure hunt routes based on their location. Based on these clues or directions, players change their locations. Based on these changed locations, as determined by the location positioning devices, additional clues or directions are given to the players until one of the players completes the treasure hunt route and arrives at the treasure to win the game. The game also incorporates other variables in determining the clues to provide to players, such as the location of other players, the previous locations of the player and other players and whether the player has correctly solved certain clues.

24 Claims, 4 Drawing Sheets

TREASURE HUNT GAME UTILIZING WIRELESS COMMUNICATIONS DEVICES AND LOCATION POSITIONING TECHNOLOGY

FIELD OF THE INVENTION

The present invention relates to wireless positioning and communication technologies as applied to a game of treasure hunt or scavenger hunt.

BACKGROUND

Treasure hunts are a well-known form of entertainment enjoyed by persons of all ages. In a typical treasure hunt game a person or persons follow(s) a series of clues that lead them to the treasure. The clues are predetermined by a gamemaster who places the clues along a preset path such that the clues, when deciphered, lead the treasure seeker along the path to the treasure. The prior art reflects numerous variations on this general concept.

U.S. Pat. No. 5,236,200 discloses a card-like structure with detachable elements. The elements contain placement instructions for the gamemaster and messages or clues for the treasure seeker that facilitate the gamemaster guiding the treasure seeker to the treasure.

U.S. Pat. No. 5,924,695 and U.S. Pat. No. 5,511,792 disclose board games based on a pirate's treasure hunt theme.

U.S. Pat. No. 5,679,075 discloses an interactive, multimedia game system wherein players obtain directions to various locations by viewing a narrative on an audio visual system and solving puzzles.

U.S. Pat. No. 5,933,100 discloses an automobile navigation system that utilizes GPS. In the '100 patent, vehicle location, determined by GPS, and travel time, determined by a timer, are transmitted from the vehicle to a central database via a wireless communications device such as a cellular telephone. The central database utilizes this information to compile travel times and determine optimum travel routes.

U.S. Pat. No. 5,646,629 discloses an apparatus combining a handheld, electronic video game device, a location determination receiver, an electronic map and/or electronic yellow pages, and geocoding.

U.S. Pat. No. 6,023,241 discloses a recorder with a GPS receiver that is able to record video frames and/or audio data in association with GPS coordinates such that the user may determine the location of associated photographs taken digitally and may recreate excursions using a multimedia approach.

U.S. Pat. No. 5,942,969 discloses a treasure hunt game wherein clues that lead the players to a treasure are transmitted to the players via pagers. Under the '969 patent, a player's general location may be verified by determining which pager-base station is receiving the player's pager signal and subsequent clues given only when the player is in the correct general location.

This application is related to another application by the inventor, application Ser. No. 09/535,371, titled Treasure Hunt Game Utilizing GPS Equipped Wireless Communications Devices, filed on Mar. 24, 2000, and issued on Nov. 20, 2001 as U.S. Pat. No. 6,320,495. That patent discloses a treasure hunt game utilizing wireless communication technology that incorporates global positioning satellite ("GPS") technology such that a treasure hunt game can be played wherein clues are based upon the positions of the contestants.

Other location positioning technologies beyond GPS, however, can also be utilized with the treasure hunt game disclosed in Applicant's prior invention. Some of those technologies are described below.

U.S. Pat. No. 6,188,351 discloses a form of assisted GPS wherein the GPS receiver is integrated with a transceiver that is capable of communicating with a cellular or PCS network via the air-interface particular to that network. Standard information provided by the network is used to assist the integrated GPS receiver and improve its sensitivity and latency. The result is that the receiver can rapidly acquire satellites and compute its position in environments where conventional, stand-alone GPS receivers cannot.

U.S. Pat. No. 6,108,558 discloses a method for calculating a location of a remote unit utilizing observed time difference (OTD) and real time difference (RTD) measurements. Other location based technologies are well known and include angle of arrival ("AOA"), time of arrival ("TOA") and cell-ID. Additional location positioning technologies could also be utilized.

The present invention expands upon the applicant's prior invention by disclosing a treasure hunt game utilizing wireless communication devices that incorporate location based technologies beyond GPS.

All documents, including other patents and references, referred to in this document are hereby incorporated by reference in their entirety, although no documents are admitted to render any of the claims herein unpatentable either alone or in combination with any other references known by the applicant.

SUMMARY OF THE INVENTION

In the present invention, each participant is equipped with a wireless communication device, such as a mobile web-enabled cellular telephone, that also incorporates some form of location positioning technology, such as assisted-GPS, OTD, RTD, AOA, TOA or cell-ID, and a treasure hunt-type game is played. Participants are given clues directing them along a pre-determined route toward the treasure through the wireless communication device. Players must solve the clues in order to proceed along the pre-determined route and eventually to the treasure. A software program determines the clue to display to each game participant based on certain variables, including the present position of the participant. Each player's position in the game is calculated by the location positioning device and transmitted to the software program by the wireless communication device. Other variables, such as the number of clues or messages that have been correctly interpreted and the position of other players may also be factored into the determination of which clue to display to the participants. The participants follow the clues along the route to the treasure. The first player to arrive at the treasure wins.

The game can be played on a small scale where participants utilize hand-held wireless communication devices incorporating location positioning technology to seek a treasure on foot, or on larger scales where the devices may be mounted on automobiles or other means of transportation. The game can be designed to be played in a multitude of geographic treasure hunt territories. The use of a web enabled wireless communications device allows the internet and world wide web to be used as the medium to transmit clues to players and receive their positions. It also allows players to utilize the resources of the web to solve clues and provides a means for nonparticipants in the game to follow along. The web is also ideal for providing advertising space to game sponsors and others.

DETAILED DESCRIPTION

A preferred embodiment of the present invention will now be explained using the drawings. Given the broad concept of uniting location positioning technologies and wireless communication in a gaming format that is set forth by this invention, it should be apparent that a wide variety of games could be practiced under the general concept of the invention. A wide variety of clues or directions, or player options could also be utilized. The description that follows is one preferred embodiment of the many possibilities inherent in the invention and should not be read to limit the scope of the present invention which is defined by reference to the claims.

Figure 1:
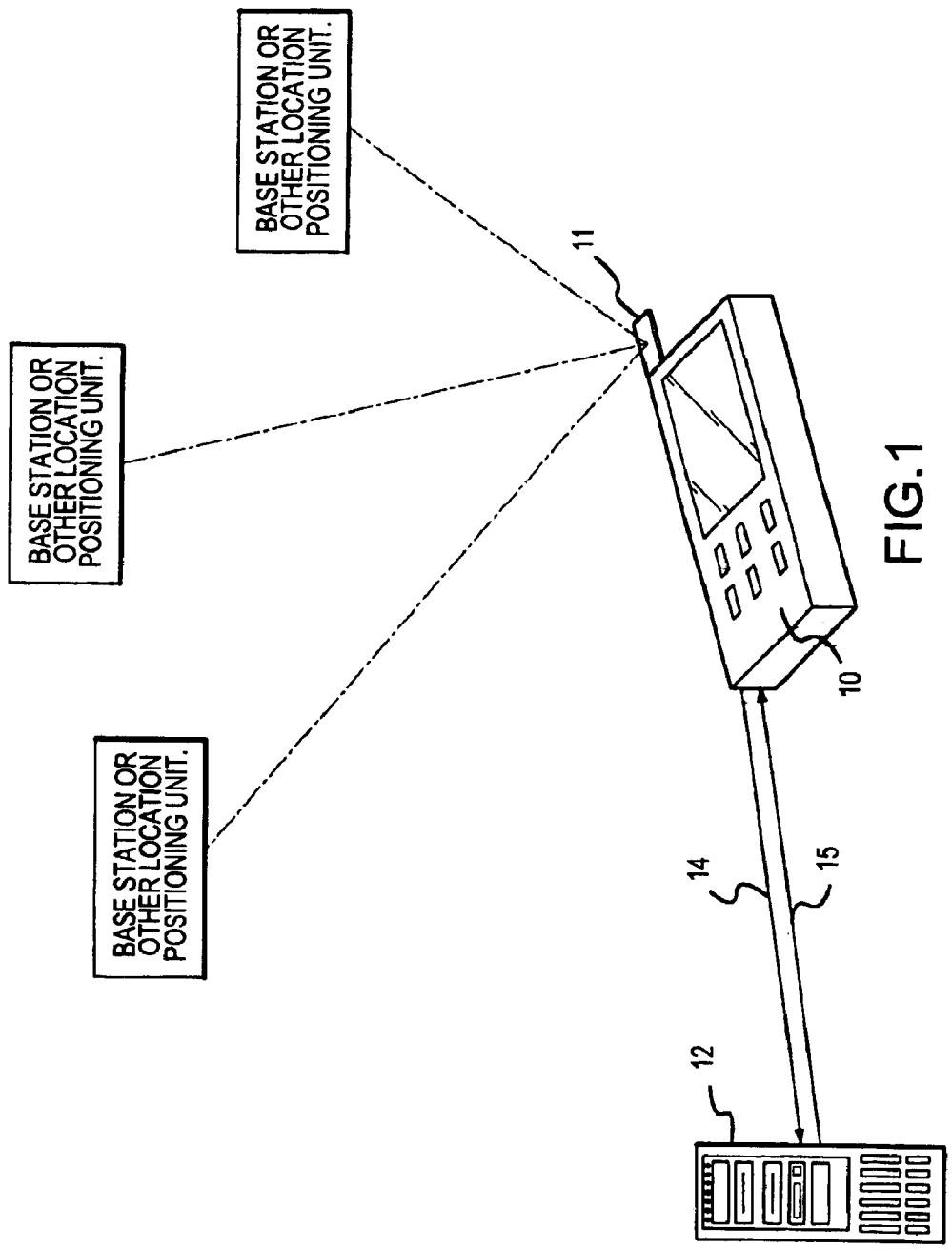
FIG. 1 depicts the general hardware of the game.

Under the present invention a treasure hunt game is designed over a certain territorial area. While the game disclosed in the present invention could easily be played with one player, for ease of reference in this specification a game played with more than one player is described. FIG. 1 is a general diagram of the components utilized by the invention. Each player is equipped with a mobile wireless communication device (10), ideally web enabled, that incorporates some form of location positioning technology such as assisted GPS, OTD, ETD, AOA, TOA or cell-ID. The communication device (10) may be hand held, or it may be mounted in a vehicle such as a car or a boat. A "gamemaster" computer (12) is programmed to run the treasure hunt. The players' location positioning receivers (11) determine player locations which are transmitted (14) back to the gamemaster by the players' wireless communication devices. The gamemaster determines the next clue to be given to a particular player based upon the player's location and possibly other variables, such as the number of clues the player has correctly answered or the position of the other players. That next clue is then transmitted (15) to the player and displayed on the player's wireless communication device (10). The players interpret the clues and proceed along a predetermined route, possibly including detours, to the treasure. The first player to arrive at the treasure wins the game.

In one embodiment of the invention, game participants pay a fee to participate in the game and try to win the treasure. In another embodiment, commercial sponsors support the game in exchange for affiliation with the game and advertising rights. The game can be played on a small private scale or on a larger commercial scale, potentially with the game televised or otherwise accessible for viewing or tracking the progress of players through a website on the world wide web or other means.

The game is organized, scheduled and promoted, and players are selected. Each player, or group of players if the game is played in teams, is equipped with a wireless communications device (10) that incorporates a location positioning technology receiver (11). The wireless communications devices (10) are designed to transmit player locations, generated by the location positioning technology, back to the central gamemaster computer (12). The wireless communications devices (10) may be handheld units or they may be mounted in automobiles or other modes of transportation.

In the preferred embodiment of the invention, the wireless communications devices (10) are capable of accessing the Internet. In that case, player positions are transmitted back to the gamemaster (12) via the Internet. Communication devices capable of accessing the Internet offer other benefits that may be realized through the game. Clues can be more difficult if players have ready access to the resources connected to the Internet to solve them. Clues are transmitted to the players' wireless communication devices (10). Clues maybe simple text, or they may include video, music, cartoons/animation, still pictures, sound, diagrams or any combination of the above. It will be recognized by those skilled in the art that an endless variety of clues can be transmitted to the game players and the list of potential clue formats given above is not intended to limit the type of clues that may be utilized by the invention. The game itself can be run and accessed from a site located on the World Wide Web. This website allows individuals who are not participating in the game to follow along with the players' progress. Advertisements can be placed on the website to generate revenue.

Figure 2:
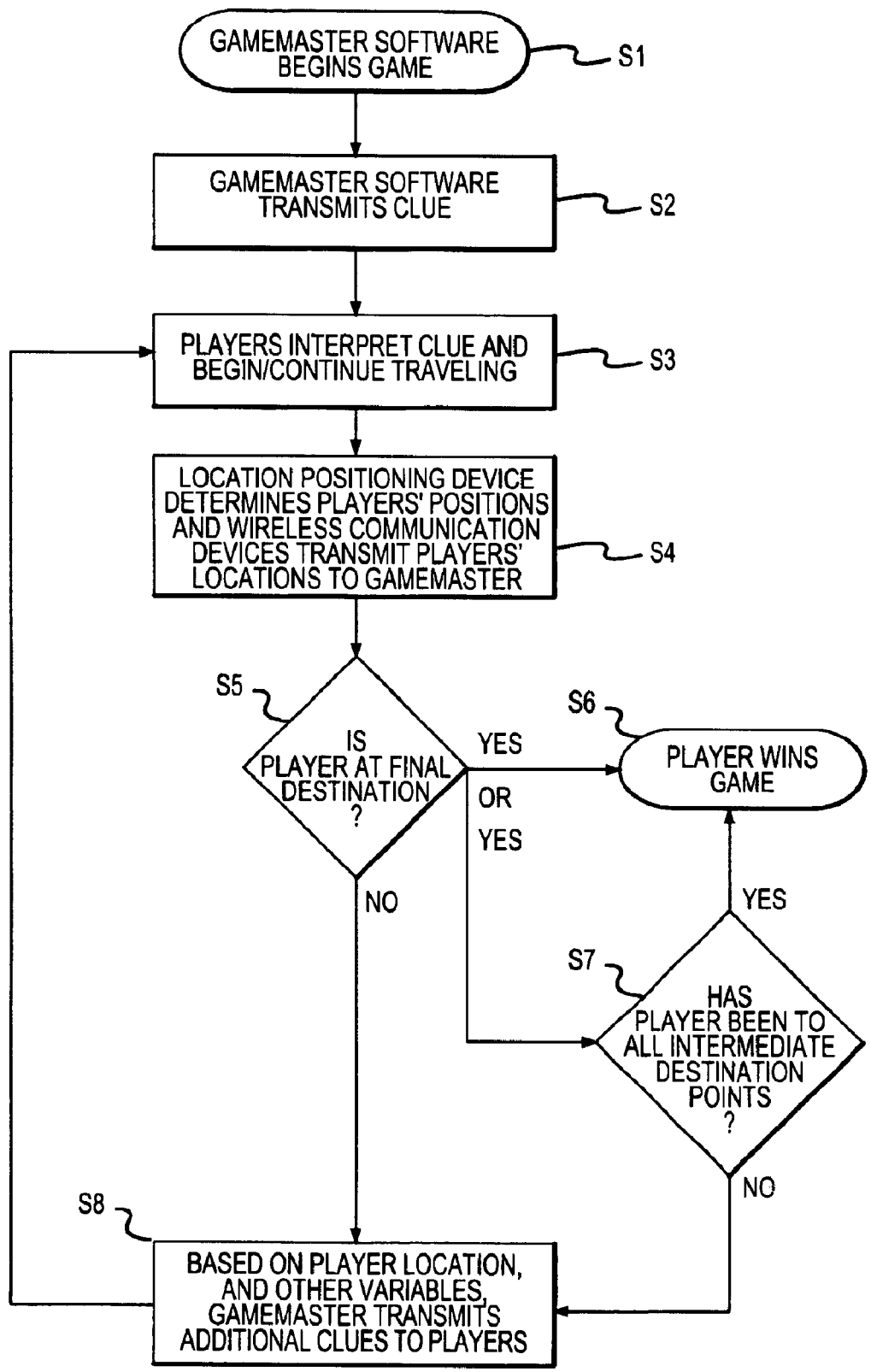
FIG. 2 is a flowchart that shows how the game is organized and played.

The players may begin the game all together in one starting location or they may all start in different locations. FIG. 2 is a flowchart that shows a preferred method of running a game using the present invention. When all players are in their starting position, the game begins (S1). At (S2), the gamemaster (12) transmits a first clue to each of the game players, who receive the clue on their wireless communications device (10). The first clue may be the same for all players or individualized for each player based on their location. At (S3) the players interpret the clue and based on that interpretation begin to travel. At (S4), the players' wireless communications devices (10) transmit player positions, determined with the location positioning technology, back to the gamemaster (12). At (S5), the gamemaster (12) determines whether a player is at the treasure location. If not, at (S8) the player is given another clue based on his or her location and possibly other variables. The player then interprets this clue and continues traveling, hopefully toward the treasure (S3). Player location is again determined and transmitted back to the gamemaster (12) and the game continues (S4).

If a player is at the treasure location there are two possibilities. Either the player is the winner (S6), or (S7) the gamemaster (12) determines if the player has been to any or all intermediary points in the treasure hunt territory. If yes, the player is the winner (S6). If not, the player is given another clue (S8), and continues playing the game.

Figure 3:
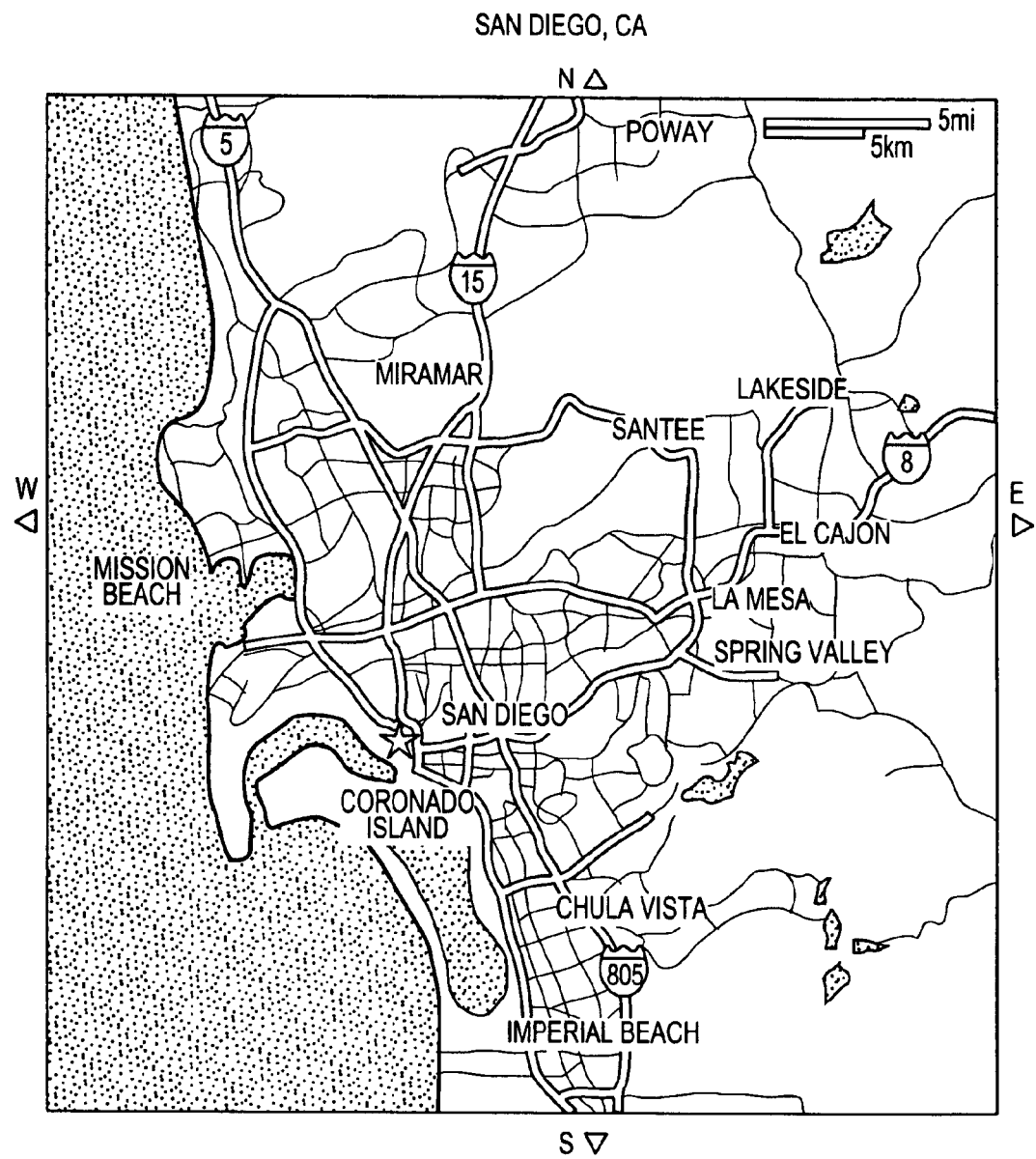
FIG. 3 is a depiction of one possible geographic area in which the present invention may be practiced.
Figure 4:
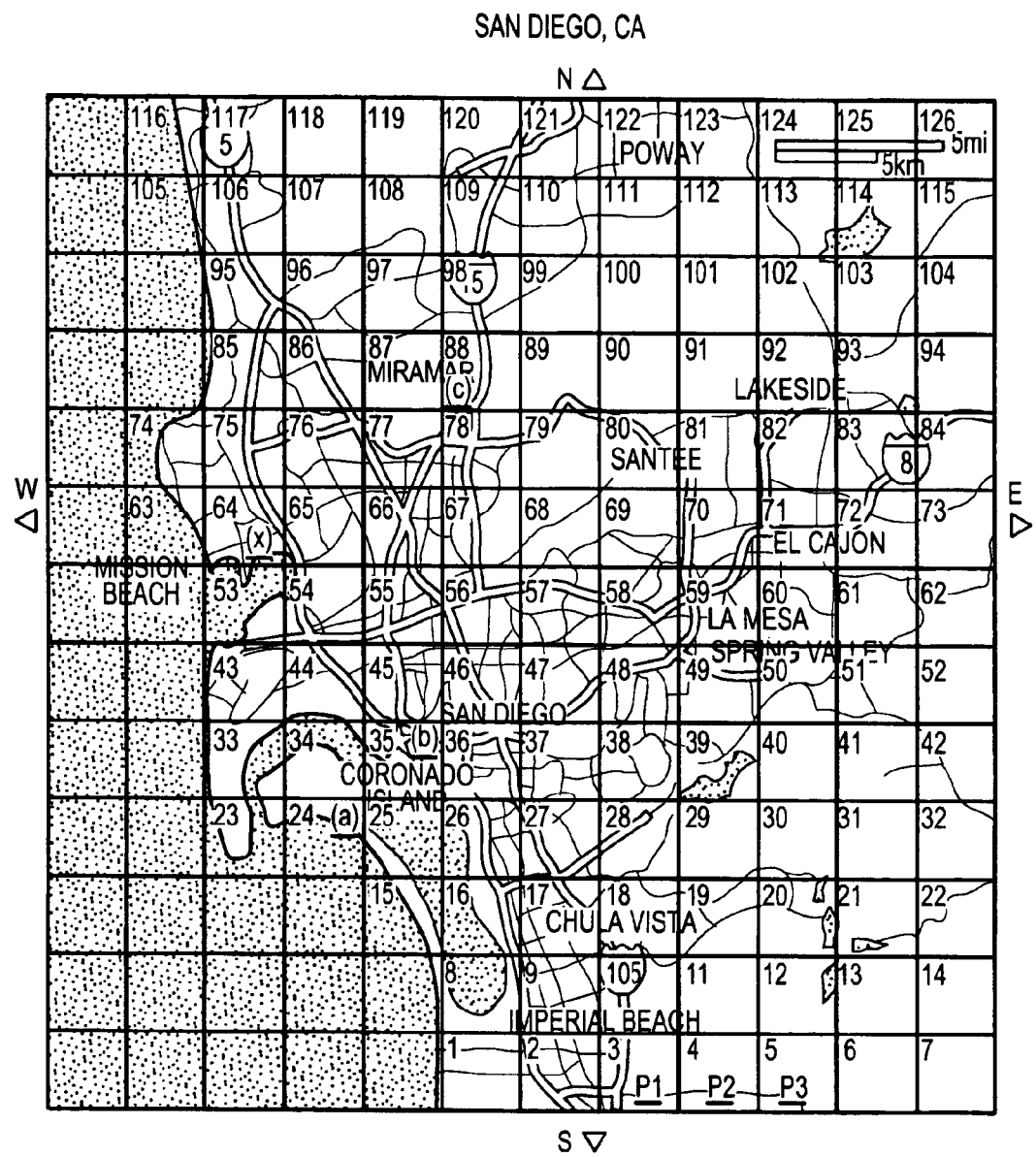
FIG. 4 is a depiction of a grid overlaid on one possible geographic area in which the present invention may be practiced that facilitates generating clues based on player locations.

FIG. 3 shows a preferred method for designing the game so that clues are given based on the players' locations. In FIG. 3, a general map of the treasure hunt territory is input into the gamemaster computer (12). The treasure hunt territory is then divided into a plurality of smaller segments, a grid, and each segment is assigned a unique number, as depicted in FIG. 4. The game is designed so that the clues given to players can be dependent upon what segment the player (or more specifically the players' wireless communications device (10)) is in, what segments other players are in, how many clues the players have properly solved, and/or how many points along the treasure hunt route each player has passed.

The grid method is just one means of utilizing the location positioning data to track player locations as well as their proximity to the destination point and other players. Another method to accomplish this result would be to compute each player's position based on a range and bearing from the next destination point in the game and to distribute clues based on the determined range and bearing. Those skilled in the art of navigation will recognize that there are many other methods in which the players' locations, and proximity to other players, can be factored into the game.

Utilizing the grid method and FIG. 4, one potential game situation is described. This game situation is by way of illustration only and in no way limits the limitless variety of locations and clues inherent in the invention. For example, clues may not only be based in a wide variety of mediums, they may also be linked to other mediums, such as television programs, books, magazines, pictures, buildings, on the World Wide Web or any number of other mediums or combinations thereof. The game can be designed to be played over a multitude of different geographic locations and game territories. In this example, the treasure hunt territory is the San Diego, Calif. area, FIG. 3. As seen in FIG. 4, a map of the treasure hunt territory is divided into a grid and each grid segment is assigned a unique number. The treasure hunt territory described in this instance is an area of many square miles. Therefore, we will assume in this example that the players will utilize automobiles or some other form of transportation (bicycles, motorcycles, etc.). The forms of transportation may be equipped with the mobile wireless communication devices (10) incorporating location positioning technology or the players may utilize hand held devices. In this example, the game is played on land. There is no reason, however, that the game could not include water based destinations and utilize boats or other watercraft equipped with wireless communications devices and location positioning In this example, there will be three players. P1, P2 and P3, starting in grid positions 3, 4, and 5, at the southern end of the treasure hunt territory. The treasure hunt route in this example has three intermediary points and a final treasure location. The intermediary locations are: (a) the lobby of the Hotel Del Coronado on Coronado Island; (b) the reptile house at the San Diego Zoo; and (c) the east entrance to the Marine Corps Air Station at Miramar. The final treasure location is (x) the historic wooden roller coaster in Mission Beach.

The first clue, a riddle, is transmitted via the wireless communications system to the players' wireless communications devices (10). The clue reads: To the south is Tijuana, to the north LA, proceed north and cross a bridge to where famous people sometimes stay. From this clue the players begin to travel, presumably to the north. As the players move, their location positioning receivers (11) transmit their locations back to the gamemaster (12) As players enter a new grid they receive a new clue. The new clue is based not only on the player's new location, but also on their previous location(s) and/or the locations and previous locations of the other players. For example, if P1 (who started in grid 3) has proceeded north to grid 9, the gamemaster (12) might base her next clue on some or all of the following nonexclusive list of variables: (1) is the player's present location further along the pre-determined treasure hunt route than her previous position; (2) have any of the other players already reached the first intermediary destination point; and (3) are any of the other players closer to the first intermediary destination point than the player to receive the clue. Additionally, players can be required to solve puzzles or other clues and transmit the correct answer back to the gamemaster before receiving additional clues. The game continues with players being provided clues based on these and potentially other variables until a player arrives at the treasure and is declared the winner.

In one embodiment of the game, players have the option of proceeding on detours in search of other prizes or treasures. In this embodiment, the gamemaster (12) transmits these options to the players based on variables such as those listed above. If a player elects to proceed along such a detour they are provided clues that lead them toward the secondary prize or treasure. Once the secondary prize or treasure is located, the player wins that prize and is given clues back to the predetermined treasure hunt route and toward the ultimate treasure. Players may be given clues as to the progress of other players such that they have to make a determination whether to continue on their detour. In this way the game provides for entertaining diversions and the chance for players to risk falling behind in the ultimate treasure hunt in order to seek additional prizes.

The game could also be designed such that players are given clues that direct them to locate various objects in a scavenger hunt type game. In this embodiment the player who first acquires all of the required objects is the winner.

The preceding examples only describe certain preferred embodiments of the invention. The invention can be utilized in a variety of geographic locations of a variety of sizes and can incorporate an endless variety of clues and diversions. The examples listed above are intended to enable others skilled in the art to practice the invention's unique pairing of wireless communications devices and location positioning information in a treasure hunt type game. The invention is not limited to the example above, its scope is defined by the following claims.

The invention claimed is:

1. A method of playing a game, involving proceeding from a starting site to an ending site, using a wireless communications system and at least one wireless communications device having location positioning technology, comprising the step of:
   (a) utilizing said location positioning technology to determine a location of a game participant's wireless communications device;
   (b) generating a message for display on the game participant's wireless communications device responsive to said determined location of said wireless communications device and also responsive to a determined location of at least one other game participant's wireless communication device, in such a way that the game is facilitated by providing messages to game participants that are based on a relative determined location in the game of at least one other game participant's wireless communication device, said message including information to assist in finding a next site;
   (c) moving to a new location; and
   (d) repeating steps (a), (b) and (c) until arriving at an ending site.

2. The method of claim 1, wherein said wireless communications device includes a transceiver for wireless communication with a computer network over said wireless communications system, said computer network having a set of data and further comprising transmitting location information from said wireless communications device to said computer network and transmitting said message from said computer network to said device.

3. The method of claim 2, wherein said computer network utilizes the infrastructure of the Internet and said location and message are transmitted over the Internet.

4. The method of claim 1, wherein said message responsive to said determined location is a clue that must be solved.

5. A method of playing a game, involving proceeding from a starting site to an ending site, using a wireless communications system and at least one wireless communications device having location positioning technology, comprising the steps of:
   (a) utilizing said location positioning technology to determine a location of said wireless communications device;
   (b) generating a message for display on the game participant's wireless communications device responsive to said determined location of said wireless communications device, and also responsive to at least one previously determined location, where said at least one previously determined location is not a predetermined intermediate site, such that said message is dependant upon said at least one previous determined location as well as a present determined location of the game participant's said wireless communications device, said message including information to assist in finding a next site;
   (c) moving to a new location; and
   (d) repeating steps (a), (b) and (c) until arriving at an ending site.

6. The method of claim 5, wherein said wireless communications device includes a transceiver for wireless communication with a computer network over said wireless communications system, said computer network having a set of data and further comprising transmitting location information from said wireless communications device to said computer network and transmitting said message from said computer network to said device.

7. The method of claim 6, wherein said computer network is the internet and said location and message are transmitted over the internet.

8. The method of claim 5, wherein said message responsive to said determined location is a clue that must be solved.

9. A game, involving proceeding from a starting site to an ending site, using a wireless communications system, comprising:
   (a) at least one wireless communications device utilizing location positioning technology for determining a location of a game participant's wireless communications device;
   (b) a message displayed on said wireless communications device responsive to said determined location of said wireless communications device and also responsive to a determined location of at least one other game participant's wireless communications device, in such a way that the game is facilitated by providing messages that are based on a relative determined location in the game of at least one other game participant's wireless communications device, said message including information to assist in finding a next site;
   (c) wherein the game is a treasure hunt and the object of the game is to utilize said messages to proceed to a particular ending site.

10. The game of claim 9, wherein said wireless communications device includes a transceiver for wireless communication with a computer network having a set of data and further comprising transmitting location information from said wireless communications device to said computer network and transmitting said message from said computer network to said device.

11. The game of claim 10, wherein said computer network utilizes the infrastructure of the Internet and said location and message are transmitted over the Internet.

12. The game of claim 9, wherein said message responsive to said determined location is a clue that must be solved.

13. A game, involving proceeding from a starting site to an ending site, using a wireless communications system, comprising:
   (a) at least one wireless communications device utilizing location positioning technology for determining the location of said wireless communications device;
   (b) a message displayed on said wireless communications device responsive to said determined location of said wireless communications device and also responsive to at least one previously determined location, where said at least one previously determined location is not a predetermined intermediate site, such that said message is dependant upon said at least one previous determined location as well as a present determined location of the game participant's wireless communications device, said message including information to assist in finding a next site;
   (c) wherein the game is a treasure hunt and the object of the game is to utilize said messages to proceed to a particular ending site.

14. The game of claim 13, wherein said wireless communications device includes a transceiver for wireless communication with a computer network over said wireless communications system, said computer network having a set of data and further comprising transmitting location information from said wireless communications device to said computer network and transmitting said message from said computer network to said device.

15. The game of claim 14, wherein said computer network utilizes the infrastructure of the Internet and said location and message are transmitted over the Internet.

16. The game of claim 13, wherein said message responsive to said determined location is a clue that must be solved.

17. A method of playing a game, involving proceeding from a starting site to an ending site, using a wireless communications system and at least one wireless communications device having location positioning technology, comprising the steps of:
   (a) utilizing said location positioning technology to determine a location of said wireless communications device;
   (b) generating a message for display on the game participant's wireless communications device responsive to said determined location, where said determined location of said wireless communications device is not a predetermined intermediate site, said message including information to assist in finding a next site;
   (c) moving to a new location; and
   (d) repeating steps (a), (b) and (c) until arriving at an ending site.

18. The method of claim 17, wherein said wireless communications device includes a transceiver for wireless communication with a computer network over said wireless communications system, said computer network having a set of data and further comprising transmitting location information from said wireless communications device to said computer network and transmitting said message from said computer network to said device.

19. The method of claim 18, wherein said computer network utilizes the infrastructure of the Internet and said location and message are transmitted over the Internet.

20. The method of claim 17, wherein said message responsive to said determined location is a clue that must be solved.

21. A game, involving proceeding from a starting site to an ending site, using a wireless communications system, comprising:
   (a) at least one wireless communications device utilizing location positioning technology for determining the location of said wireless communications device;
   (b) a message displayed on said wireless communications device responsive to said determined location of said wireless communications device, where said determined location is not a predetermined intermediate site, said message including information to assist in finding a next site;
   (c) wherein the game is a treasure hunt and the object of the game is to utilize said messages to proceed to a particular ending site.

22. The game of claim 21, wherein said wireless communications device includes a transceiver for wireless communication with a computer network over said wireless communications systems, said computer network having a set of data and further comprising transmitting location information from said wireless communications device to said computer network and transmitting said message from said computer network to said device.

23. The game of claim 22, wherein said computer network utilizes the infrastructure of the Internet and said location and message are transmitted over the Internet.

24. The game of claim 21, wherein said message responsive to said determined location is a clue that must be solved.

* * * * *